Dec. 27, 1966 N. GOLD 3,294,898

COMPATIBLE COLOR TELEVISION

Filed Aug. 21, 1963 5 Sheets-Sheet 1

INVENTOR.
Nathan Gold
BY
Brown and Mikulka
and
Donald M. Sandler
ATTORNEYS

INVENTOR.
Nathan Gold
BY Brown and Mikulka and Donald M. Sandler
ATTORNEYS

Dec. 27, 1966 N. GOLD 3,294,898

COMPATIBLE COLOR TELEVISION

Filed Aug. 21, 1963 5 Sheets-Sheet 3

INVENTOR.
Nathan Gold
BY Brown and Mikulka and Donald M. Sandler
ATTORNEYS

Dec. 27, 1966 N. GOLD 3,294,898

COMPATIBLE COLOR TELEVISION

Filed Aug. 21, 1963 5 Sheets-Sheet 4

INVENTOR.
Nathan Gold
BY
Brown and Mikulka
and
Donald M. Sandler
ATTORNEYS

INVENTOR.
Nathan Gold
BY Brown and Mikulka
and
Donald M. Sandler
ATTORNEYS

United States Patent Office 3,294,898

Patented Dec. 27, 1966

3,294,898
COMPATIBLE COLOR TELEVISION

Nathan Gold, Sharon, Mass., assignor to Polaroid Corporation, Cambridge, Mass., a corporation of Delaware Filed Aug. 21, 1963, Ser. No. 303,535
13 Claims. (Cl. 178—5.2)

This invention relates to color television, and more particularly to a color television system that is ideally suited to produce a color display in accordance with the so-called "red-white" theory of color, but which is compatible with existing conventional monochrome receivers, and conventional color receivers that operate on the classical theory of three primary colors.

The "red-white" theory of color has been utilized to produce full color displays by causing the red color-separation image formed at the transmitting end of the system to be reproduced on the receiver screen in red light (that need not necessarily match the red filter by which this color-separation image is formed) during one field scan; and by causing, during the next field scan, the green color-separation image to be reproduced in achromatic light such that the two reproductions are interleaved and in optical registration. By a process not clearly understood at the present time, an observer sees a reproduction of the scene being televised with good color fidelity. That is to say, an observer viewing the kinescope sees the scene in full color, even though only reddish or achromatic light is emitted from each picture element of the screen.

Since "red-white" color television requires only two independent information components, as compared to the three inherent in the conventional system of color television of three primary colors; and since recent improvements in the construction of bi-color kinescopes indicate that the "red-white" receiver is less complex than the conventional three-color receiver, there is a great deal of interest in developing a compatible television system that is capable of efficiently furnishing the required signal components via a radiated signal. In order to be compatible, such signal must be capable of producing black and white images on monochrome receivers and color images on both conventional three-color receivers as well as "red-white" receivers. In addition, the "red-white receiver, like the conventional three-color receiver must be capable of producing black and white images during standard monochrome transmission. These requirements dictate that the scanning frequency and sync pulse details remain the same; that one signal component contain roughly the same information conveyed by a monochrome signal; that the standard spacing between the picture and sound carriers in the broadcast channel be maintained; and that the radiated signal conform to the FCC standards for compatible color television.

The primary object of the present invention is to provide a compatible color television system of the type described wherein the RF signal generated for color transmission contains only the two components necessary to produce a display in color according to the "red-white" theory, and wherein the "red-white" receiver is capable of producing black-and-white images during standard monochrome transmission.

Before briefly describing the essential features of the present invention whereby the primary object is achieved, a review of the generation and transmission of signals in accordance with the present FCC standards for compatible color television will permit the novel operation of the present invention to be better understood. A camera, containing three pick-up tubes, provides three independent electrical signals individually associated with red, green and blue color-separation images of the scene being televised. These signals are passed through nonlinear amplifiers (gamma correction) which provide compensation for the nonlinearity of the kinescope elements at the receiving end of the system. The gamma-corrected signals are then matrixed or cross-mixed to produce a luminance signal M, and two chrominance signals I and Q. The signal M corresponds closely to the signal produced by a monochrome camera, and is transmitted using the same bandwidth as a monochrome signal (nominally 4 megacycles). The signal I corresponds to colors along the orange-to-cyan axis of a Maxwell triangle, and the signal Q corresponds to colors along the yellow-green-to-purple axis. Because the color acuity of the human eye is greater for color differences along the orange-to-cyan axis than along the yellow-green-to-purple axis, the bandwidths allotted to each of the chrominance signals are proportioned to the eye's demand for the type of information conveyed. Accordingly, the I bandwidth is nominally 1.5 mc. and the Q bandwidth is nominally 0.5 mc. Because of these bandwidth limitations, the M, I and Q signals are independent only for frequency components below 0.5 mc. From 0.5 to 1.5 mc., the signals have two degrees of freedom and above 1.5 mc., they have common high frequency components. Thus, the signals controlling the kinescope at the receiving end of the system, and derived by matrixing the received M, I and Q signals, are not identical to the original signals applied to the transmitter matrix.

An ingenious multiplexing technique is used to transmit the M, I and Q signals to the compatible receiver. The I and Q chrominance signals are modulated upon two frequency-interlaced subcarriers of the same frequency but in phase quadrature such that both the carrier and the original I and Q signals are suppressed leaving only the sidebands. The M signal and the two subcarriers modulated by the I and Q chrominance signals, together with necessary sync information are all added to produce a complete or composite color television signal containing both picture and synchronizing information. This signal is broadcast by a standard television transmitter.

Carrier reinsertion at the receiver for use in synchronous demodulation and recovery of the I and Q signals is achieved by providing a phase-locked oscillator producing the subcarrier frequency. To provide synchronizing information, bursts of the subcarrier at the transmitter of pre-established phase are gated onto the back porch interval of each horizontal synch pulse. FCC standards require that the phase of the burst be 57° ahead of the I component (which leads the Q component by 90°).

Two features of the above-described compatible color television system most important to understanding the compatible nature of the present invention relate to the frequency-interlace of the subcarrier, and to the two-phase modulation technique. Consider first a monochrome receiver picking up a broadcast signal containing the main picture carrier modulated by the M signal, and the sidebands of a suppressed auxiliary carrier that is frequency-interlaced with the main carrier. In such a receiver, the independent signals, being generally in a frequency-interlaced system, are separated by employing the time-integration properties of the human eye. To understand this, it should be realized that if the frequency of the subcarrier is an odd multiple of half the frame frequency, the subcarrier reverses polarity between successive scans because it passes through some whole number of cycle plus a half cycle during each frame period. If there is no appreciable motion between frames, the monochrome signal will remain the same, but the subcarrier signal will reverse phase by 180°. Thus, the subcarrier causes no objectionable interference because it is effectively cancelled out by the persistency of vision. The visual cancellation process is aided by making the subcarrier frequency an odd multiple of half the line frequency as well as half the frame frequency.

Consider now the fact that two-phase suppressed carrier modulation produces a resultant signal which varies in both amplitude and phase as the two modulating signals vary independently. It can be seen that the subcarrier resultant, obtained from the vector addition of the I and Q signals, will likewise vary in both amplitude and phase. To a first approximation, the phase of the resultant subcarrier varies with hue and the amplitude varies with saturation of the hue. Furthermore, the reproduced saturation, to a first approximation, is proportional to the ratio of the amplitude of the resultant subcarrier to the simultaneous amplitude of the monochrome signal. The hue or color termed red is represented by a subcarrier resultant whose amplitude is 63% of the maximum, and whose phase is 76.5° behind the phase of the synchronizing burst.

Since only the red and green video signals are needed at a receiver operated in accordance with the "red-white" theory of color television, the compatible color television system of the present invention contemplates generating and transmitting only these two signals. Basically, the green signal is chosen as the monochrome signal, and the red video signal is chosen as a single chrominance signal. The latter is modulated on a subcarrier whose frequency is 455 times half the line frequency (nominally 3.6 megacycles) to produce an ordinary amplitude modulated subcarrier signal containing both sidebands and the carrier. This subcarrier signal, when added to the green video signal together with appropriate synchronizing information produces a complete or composite color television signal containing both picture and synchronizing information. The television signal is made compatible by providing on each back porch interval of the horizontal sync pulses a burst of the subcarrier at a preestablished phase that leads the phase of the subcarrier, upon which the red video signal is modulated, by 76.5°. When this television signal is put "on-the-air" using a picture carrier associated with a preselected channel and the conventional vestigial sideband transmission associated with standard television broadcasting, it will cause a monochrome receiver to produce a black and white display, and both the conventional three-color receiver and the "red-white" receiver of the present invention to produce full color displays of the scene being televised in accordance with the "red-white" theory of the color television. Furthermore, monochrome transmission will cause the "red-white" receiver of the present invention to produce a black-and-white display of the scene being televised.

The black-and-white display produced by a monochrome receiver in response to the compatible television signal of the present invention is, of course, the green color-separation image of the scene being televised rendered in achromatic light. As was pointed out above, the use of a frequency-interlaced subcarrier permits the spurious signals associated with the red video signal to be substantially cancelled out by the peristence of vision of the human eye. While it makes no difference to the practice of the present invention whether the monochrome signal reproduces the red or green color-separation images in achromatic light, practical considerations make the reproduction of the green color-separation image the more desirable. This is the case because an observer viewing a familiar scene expects the gray scale of the objects in the scene to correspond to a scale that seems natural. For example, an observer expects the lips of a person being televised to be somewhat darker than the face because he knows this to be natural. With a red color-separation image reproduced in achromatic light, however, the lips appear lighter because they are redder than the surrounding skin. This is somewhat disturbing, and for this reason the green color-separation image reproduced in achromatic light would appear more natural. Of course, rabid baseball fans might be somewhat disconcerted by watching a gray baseball traverse a light gray infield.

Considering a conventional color receiver having a three gun tricolor kinescope, the receiver circuits would operate on the compatible television signal of the present invention to produce M, I and Q signals. The M signal is really the green-video signal and, since the M signal alone provides equal intensity control voltages at the grids of three guns, the M signal alone would produce an achromatic reproduction of the green color-separation image. The I and Q signals being present also contribute to the intensity control voltages, and are obtained by a synchronous demodulation process that is the same as the conventional process. However, the presence of the auxiliary carrier produces only additional high frequency components which are filtered out by the band-limited filters in the receiver, and the I and Q signals so produced effectively contribute only to the voltage control of the red gun. The result of this arrangement is that the red color-separation image is reproduced on the receiving screen in red light superimposed upon a reproduction of the green color-separation image in achromatic light. Suitable adjustments to the amplitudes of the transmitted green and red video signals permit the saturation of the reproduced red color-separation image considered alone to be adjusted to provide good color displays.

The "red-white" receiver of the present invention can separate the green picture information from the compatible color television signal because the picture carrier amplitude exceeds the auxiliary carrier amplitude due to the attenuation characteristics of a transmitter operating in accordance with FCC standards. Thus, impression of the compatible signal on a video detector, which under such conditions operates as a frequency converter as well as a detector, produces the green video signal onto which is superimposed a signal at the subcarrier frequency modulated by the red picture signal. By passing the compatible signal through a notch filter tuned to the picture carrier frequency, whereby the amplitude of the picture carrier is reduced relative to the amplitude of the auxiliary carrier, and then impressing the resultant signal on a video detector, one obtains the red video signal onto which is superimposed a signal at the subcarrier frequency modulated by the green picture signal. Having recovered the two video signals, the latter are used in a novel bi-color kinescope to reproduce the red color-separation image in red light interleaved with a reproduction of the green color-separation image in achromatic light. A suitable circuit sensitive to the presence of the color bursts permits the receiver to distinguish between monochrome and color transmission.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 1:
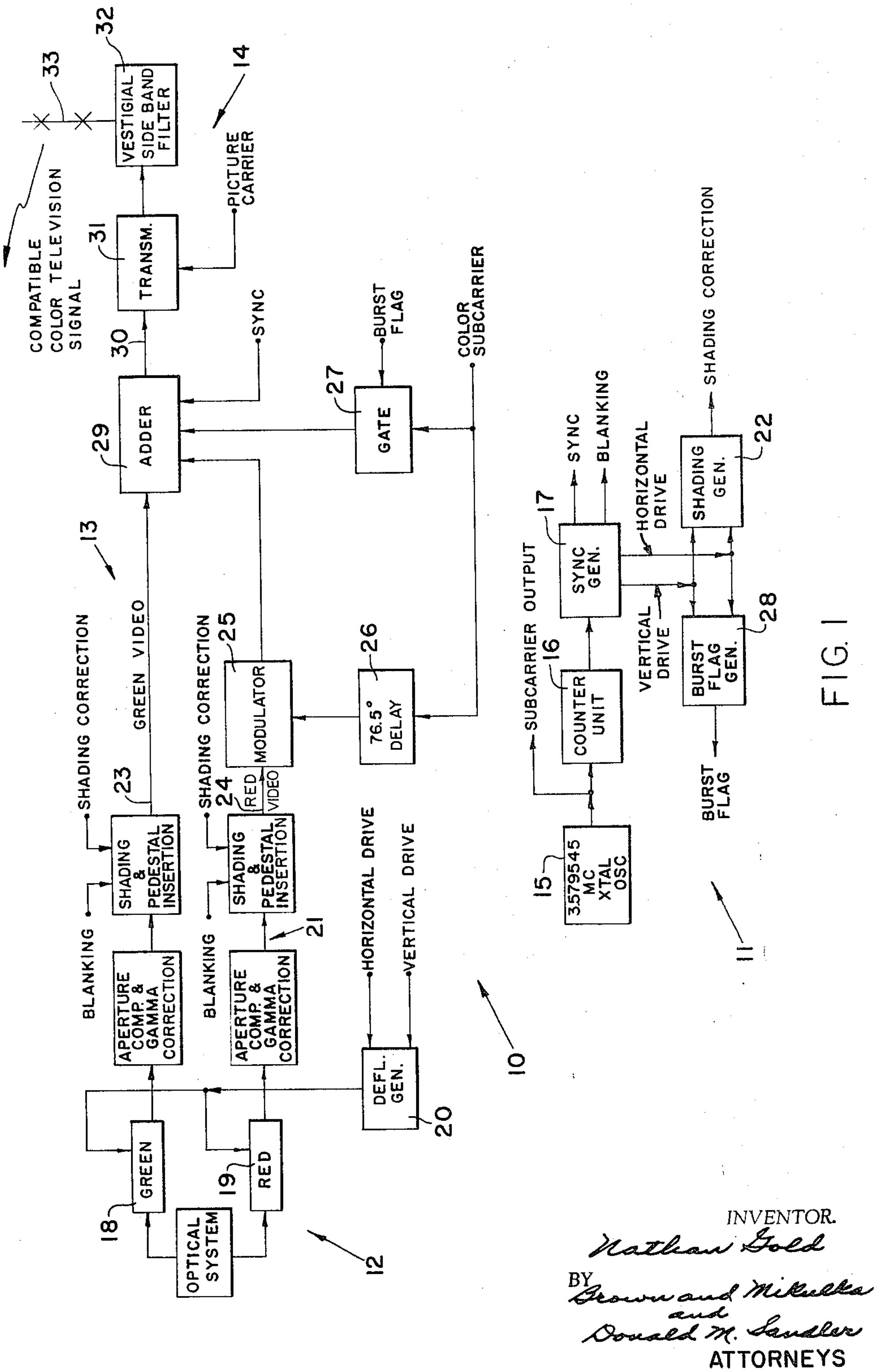
FIGURE 1 is a block diagram of a television broadcasting plant for producing a compatible color television signal containing only the red and green video information associated with scene being televised and suitable for producing a display in color according to the "red-white" theory of color.

Referring now to FIGURE 1, reference numeral 10 designates a color television broadcasting plant for producing a compatible color television signal containing only the red and green information associated with the scene being televised. Plant 10 comprises generator apparatus 11 for generating synchronizing and control signals, pick-up camera 12, encoding equipment 13 and transmitter means 14. Apparatus 11 develops the four basic timing signals adequate to control the studio apparatus: horizontal drive, vertical drive, blanking and sync. As in the case of a conventional color television broadcasting plant, the subcarrier oscillator is made the frequency standard of the television system. Accordingly, master oscillator 15 stabilized to produce a 3.579545 mc. continuous-wave signal (nominally 3.6 mc.) provides the subcarrier output, and through counter unit 16, which integrally reduces the frequency, drives sync generator 17. The output of the latter is the horizontal drive, a train of pulses at the line frequency (nominally 15.75 kc.) for control of the horizontal-deflection generator; the vertical drive, a train of pulses at the field frequency (nominally 60 c.p.s.) for control of the vertical-deflection generator; the blanking signal, a train of pulses properly timed to coincide with blanking periods provided in the television signal to allow for the retrace of the scanning beams; and the sync signal, a relatively complex pulse waveform which includes a train of horizontal synchronizing pulses interrupted 60 times a second for the transmission of a 9-line group of special pulses comprising 6 equalizing pulses (narrow pulses at a 31.5 kc. rate), a vertical synchronizing pulse 3 lines wide (but serrated by notches occurring at a 31.5 kc. rate), followed by 6 more equalizing pulses.

Camera 12 contains a light splitting optical system for the purpose of presenting to the sensitive surface of green pick-up tube 18, a green color-separation image of the scene being televised; and to the sensitive surface of red pick-up tube 19, a red color-separation image. The preamplifiers and the horizontal and vertical deflection circuits for the pick-up tubes conventionally associated therewith have been omitted for purposes of clarity, it being understood that common deflection generator 20 driven by the horizontal and vertical drive pulses causes the scanning beams of the tubes to be deflected in synchronism according to a periodic program, preferably the conventional odd-line interlaced scanning program. Each channel of camera 12 constituted by the output of a pick-up tube is processed by conventional control circuits 21 which accomplish such functions as gamma correction, aperture control, shading correction and pedestal insertion. Gamma correction is achieved by passing each channel through a nonlinear element that compensates for the nonlinearity associated with the kinescope of the receiver. Aperture compensation is achieved by operating directly on the video output of each pick-up tube to boost the amplitude of the high frequency components in order to compensate for the low-pass characteristic of the output arising because of the limited resolving power of the lenses in the optical system and the finite size of the scanning spots. Shading in a television camera refers to nonuniform sensitivity over the useful picture area, and correction of this may be achieved by the addition of special waveforms to the video signals. Such waveforms are provided by shading generator 22 which may be provided with sawtooth generators operated at the line and field frequencies. The output from generator 22 is inserted in the same circuit that blanking is inserted to establish the pedestal in the output signal of each channel.

As a consequence of this conventional operation on the output of each channel of the color camera, lead 23 associated with the green pick-up tube provides a video signal to which the sync may be added, termed the "green video signal" for convenience, and lead 24 associated with the red pick-up tube provides a video signal termed the "red video signal" for convenience. Since the scanning of the photosensitive areas of the pick-up tubes is in synchronism (with both tubes in registration to provide rasters having identical sizes, shapes and relative positions), the elemental area being scanned at each instant on each photosensitive area corresponds to the same elemental area of the scene being televised. Thus, at any instant, both video signals are representative of the brightness of different colored light emanating from the same elemental area of the scene. The dominant wavelengths of such different colored light are at different ends of the visible spectrum. That is, the dominant wavelength of the red color-separation image is longer than the dominant wavelength of the green color-separation image, and is, of course, in the so-called "long wavelength" region of the visible spectrum while the dominant wavelength of the green color-separation image is in the so-called "short wavelength" region of the visible spectrum. The actual values of dominant wavelengths of the two-color separation images are not believed to be critical except that the longer one should be in the region of the visible spectrum commonly recognized as red, and the shorter one should be in the region of the visible spectrum commonly recognized as green. The preferred filters by which the color-separation images are formed are Wratten filters No. 24 and No. 58. It has been found, however, that the red and green signals associated with commercially available three-color television cameras are adequate for producing full-color reproduction of the scene with good color fidelity.

Encoding equipment 13 produces, from the red and green video signals, a single compatible color television signal. For reasons indicated previously, the green video signal is preferred at the present time as the monochrome signal, which is similar to the M signal of conventional compatible color television broadcasting. The red video signal is modulated, by video-balanced modulator 25, on the subcarrier output of oscillator 15 after the phase of the latter is delayed by 76.5° in phase shifter 26 to provide an amplitude modulated subcarrier signal. Modulator 25 is of the type whose output includes the carrier as well as the sidebands and thus differs from the usual doubly balanced modulator associated with conventional encoding equipment. To comply with FCC color television standards, subcarrier-synchronizing information consisting of bursts of at least 8 cycles of the subcarrier frequency at a predetermined phase must be transmitted during the back-porch interval following each horizontal synchronizing pulse. This is conveniently accomplished by gating at 27 the CW signal obtained from master subcarrier oscillator 15. Gate 27 is controlled by a keying signal termed the burst flag pulse derived from burst flag generator 28 driven by the horizontal and vertical drive pulses obtained from generator 17.

Figure 2:
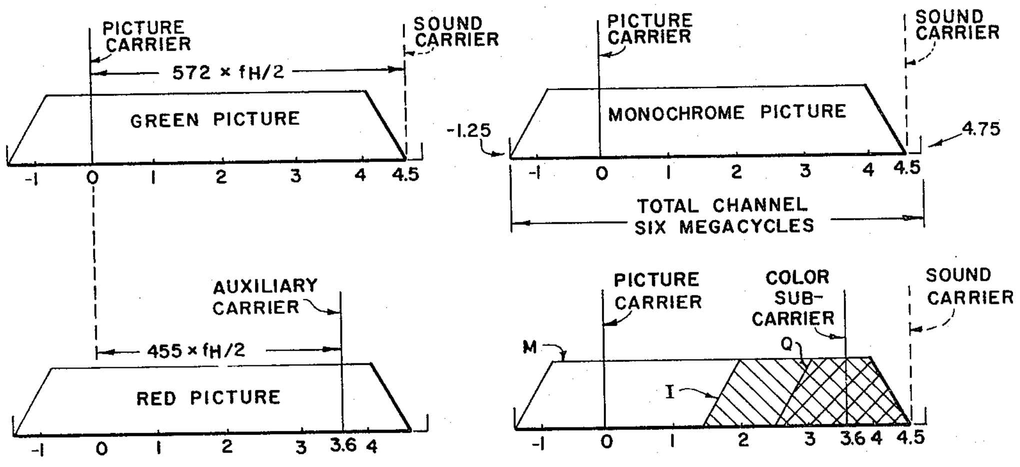
FIG. 2 shows the bandwidth characteristics of a standard monochrome transmission signal, a conventional three-color television signal, and the compatible color television signal of the present invention.

Adder 29 represents apparatus capable of combining the monochrome signal at lead 23 (green video), the color bursts provided by the output of gate 27, the modulated subcarrier signal output of modulator 25 as well as the sync output from generator 17 (if not previously added to the processed output of the green pick-up tube) to provide a total compatible color television signal prior to putting the latter on the air. Combination of these signals is conveniently accomplished by a group of amplifier stages with a common output impedance. Thus, adder 29 has a plurality of inputs and an output 30 from which the sum of the inputs is obtained. Switching, distribution and relay equipment usually associated with television broadcasting is not shown for reasons of clarity so that output at lead 30 is modulated on a main picture carrier signal at transmitter 31. After suitable filtering at 32, the compatible color television signal is broadcast from antenna 33. As shown in FIG. 2, the frequency of the main picture carrier is normally 1.25 mc. above the lower frequency limit of the standard 6 mc. television channel. In accordance with FCC requirements for visual transmitters, the over-all attenuation characteristic of the transmitter is such that the amplitude of the auxiliary carrier associated with modulation of the subcarrier on the main picture carrier is about 6 db down with respect to the main picture carrier.

As a result of the above construction, the RF television signal contains the picture carrier and the upper sideband associated with the modulation of the green video on the picture carrier; an auxiliary carrier, nominally 3.6 mc. above the picture carrier, and the lower sideband associated with the modulation of the red video on the subcarrier; as well as synchronizing information. It is thus the same as an RF television signal broadcast by a conventional color television station except that the phase of the modulated subcarrier signal relative to the color burst remains fixed at $-76.5°$. In addition, the bandwidth of the subcarrier signal is the same as the bandwidth of the monochrome signal. That is to say, the bandwidth of the monochrome signal is about 4 mc. and is constituted by the upper sidebands of the main picture carrier, while the bandwidth of the subcarrier signal is about 4 mc. and is constituted by the lower sidebands of the auxiliary carrier. The apparatus for transmitting the sound portion of the television program is conventional and is not shown in the block diagram, it being understood that such portion is transmitted using conventional frequency modulation techniques. The sound center frequency is located at 4.5 mc. above the main picture carrier frequency as required by the FC standards.

Figure 3:
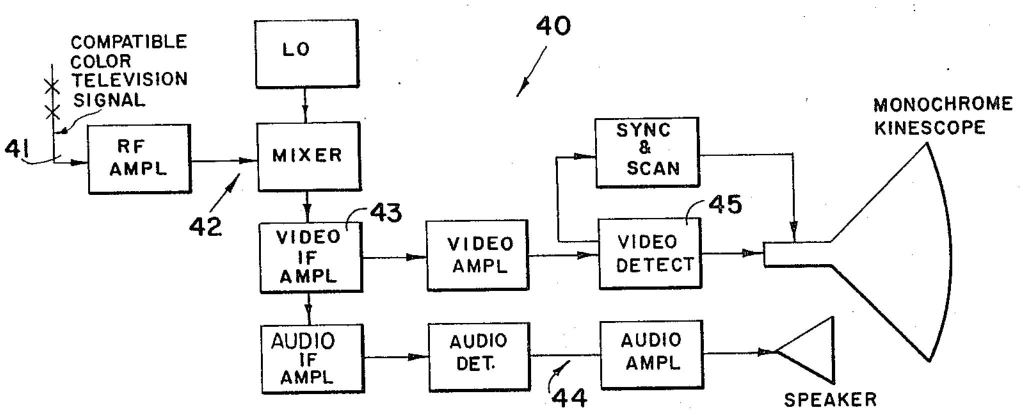
FIG. 3 is a block diagram of a conventional monochrome television receiver.

The effect of the RF television signal radiated from antenna 33 on conventional monochrome and three-color television receivers will be described first, and then reference will be made to a "red-white" color television receiver ideally suited to display in full color the scene being televised. Referring first to FIG. 3, reference numeral 40 designates a conventional monochrome receiver wherein the total compatible color television signal broadcast by antenna 33 is received at antenna 41. Assuming tuning consistence with the television channel associated with the broadcasting plant of FIGURE 1, the RF signal will be amplified and then mixed with the output of a local oscillator in apparatus 42 to convert the signal to an intermediate frequency. The output of the converter of apparatus 42 is the sound IF corresponding to the sound RF carrier; video IF corresponding to the main picture RF; and video IF corresponding to the auxiliary carrier RF. The IF signal corresponding to the audio carrier can be separated from the other signals after passing through several stages of IF amplification at 43 as shown in the drawing, or it may be permitted to pass through the entire IF strip, to be separated at the output of the video detector if receiver 40 utilizes an intercarrier-sound system. Sound channel 44 amplifies the separated IF signal corresponding to the sound RF carrier, demodulates the IF signal and causes the demodulated signal to drive the speaker and reproduce at the receiver the sound associated with the scene being televised.

The IF signals corresponding to the main and auxiliary carriers are passed through video detector 45, and the demodulated signal is applied to the control grid of the electron gun of a monochrome kinescope. Since the auxiliary carrier is frequency interlaced with the main carrier, (the subcarrier is 455 times one half the line frequency) the green and the red video signals are separated by employing the time-integration properties of the human eye as previously described. That is to say, the green color-separation image of the scene being televised is reproduced on the viewing screen of the kinescope in achromatic light. The effect of the red color-separation signal modulated on the subcarrier causes no objectionable interference because it is effectively cancelled out by the persistency of vision. Thus, an observer sees a black-and-white display of the scene being televised, and will be unaware that the green color-separation image is being viewed if unusual variations in the hierarchical order of the gray scale are compensated for. From the above, it is apparent that the signal broadcast by the apparatus of FIGURE 1 is compatible with existing monochrome television receivers.

Figures 4, 5:
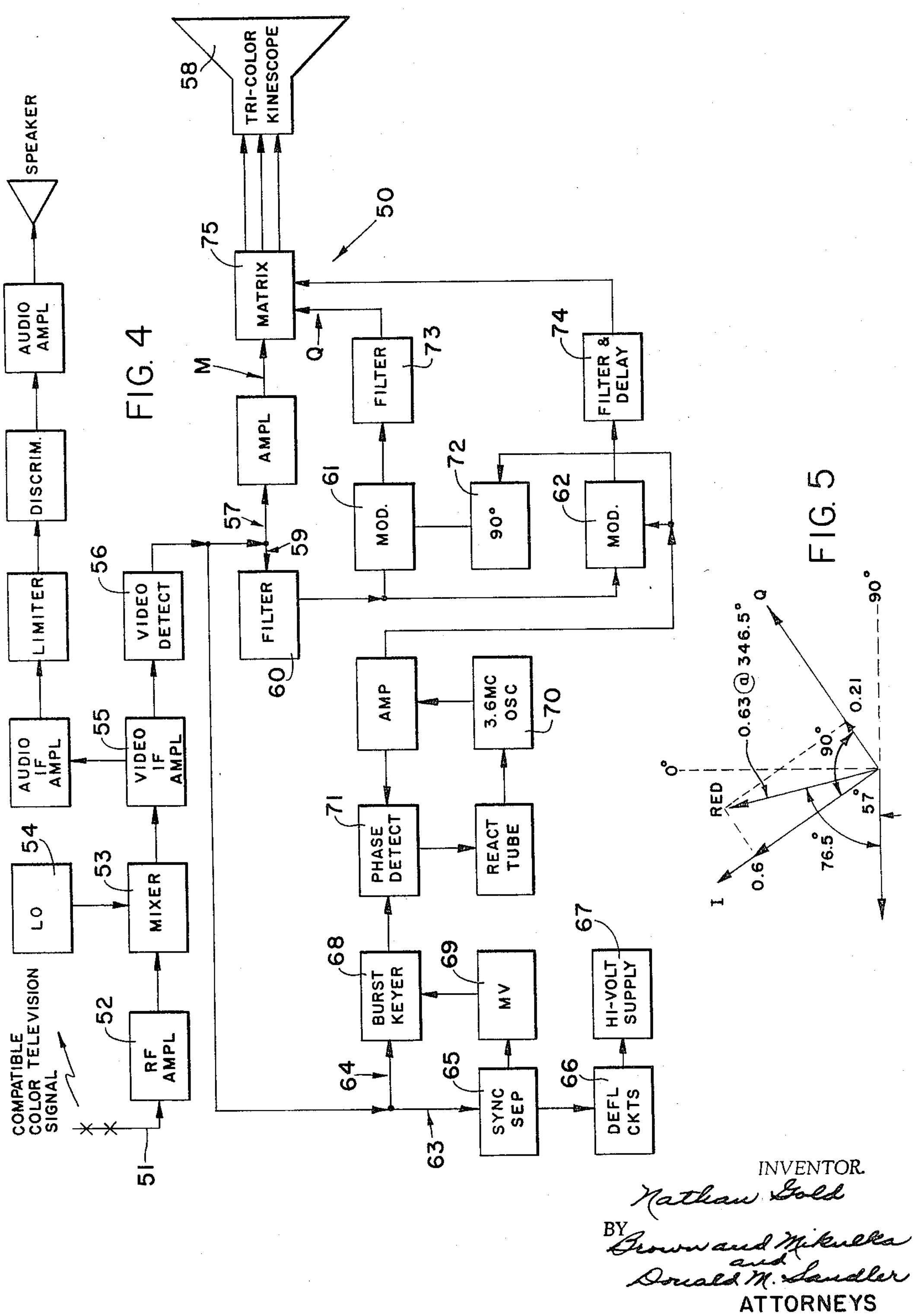
FIG. 4 is a block diagram of a conventional three-color television receiver.
FIG. 5 is a vector diagram showing the phase relationship between the I and Q signals of a conventional three-color television signal, and the resultant necessary to produce the color red.

Consider now a conventional three-color television receiver utilizing a three gun tri-color kinescope as shown in block diagram form in FIG. 4. Receiver 50 includes antenna 51, RF amplifier 52, mixer 53, local oscillator 54, video IF amplifier 55 and video detector 56 which function in the same manner as the corresponding components of the monochrome receiver of FIG. 3. As previously described, the sound signal may be obtained from a separate IF amplifier as shown in the drawing, or it may be obtained from the output of detector 56 by using the "intercarrier-sound' principle. The video signal obtained at the output of detector 56 is, for all practical purposes, the same signal that appears at lead 30 in the apparatus shown in FIGURE 1, namely a signal containing red and green picture information plus the necessary synchronizing information. The signal from detector 56 is utilized in four branch circuits. Branch 57 directs the complete signal toward tri-color kinescope 58 where it is used to control the brightness of the reproduced picture by being applied to all kinescope guns in equal proportions. In branch 59, bandpass filter 60 separates, the high-frequency components of the signal (roughly 2.0 to 4.1 mc.) consisting mainly of the modulated subcarrier signal. The output of filter 60 is applied to a pair of modulators 61 and 62 which operate as synchronous detectors to establish I and Q signals. Frequency components of the M signal falling between 2 and 4.1 mc. are also applied to the modulators and are heterodyned down to lower frequencies. These frequency components do not cause objectionable interference, however, because they are frequency interlaced and tend to cancel out through the phenomenon of persistence of vision.

Branches 63 and 64 at the output of detector 56 are provided to utilize the timing information in the signal. Sync separator 65 in branch 63 produces the timing pulses necessary to control the horizontal and vertical deflection circuits 66 of kinescope 58. The high-voltage supply may be obtained from a "fly-back" supply 67 associated with the horizontal deflection circuit. Branch 64 applies the output of detector 56 to burst gate or keyer 68 which is turned on for a brief interval following each horizontal sync pulse by means of multivibrator 69 which, in turn, is controlled by horizontal sync pulses. The separated bursts appearing at the output of keyer 68 are compared with the output of local oscillator 70 in phase detector 71. The frequency of the local oscillator is the same as the frequency of the master subcarrier oscillator at the broadcasting plant, i.e., nominally 3.6 mc. If there is a phase difference between the local signal and the bursts, an error voltage is developed by the phase detector, and a reactance tube corrects the phase accordingly. In this manner, the phase of the receiver oscillator is locked to the phase of the master subcarrier oscillator at the transmitter. The output of the receiver oscillator provides the reference carriers for the two modulators 61, 62. Phase shifter 72 provides the required 90° shift in the phase of the Q signal modulator relative to the I signal modulator.

Filters 73 and 74 provide the bandwidth limiting shown best in FIG. 2 for the I and Q signals as required by the type of signal transmission currently in use. Following these filters, matrix 75 cross mixes the M, I and Q signals to create so-called red, blue and green video signals. The latter, because of the nature of the transmitted signal, are not related to the red, blue and green content of the scene being televised. To analyze what these signals do represent, and understand what they cause to occur in the kinescope, reference is made first to FIG. 5. Recalling that the phase of the modulated subcarrier lags the burst by 76.5°, the I and Q signals produced by modulators 61 and 62 will be interpreted as representing the color red, saturation of the color being controllable by suitable adjustment to the amplitude of the green video signal relative to the amplitude of the red video signal. Thus, the I and Q signals will, after matrixing, contribute only to the red video signal. This can be seen best by considering the fact that matrix 75 provides the following output signals from the M, I and Q signals:

$$R=1.00\ M+0.96\ I+0.26\ Q$$
$$G=1.00\ M-0.27\ I-0.65\ Q$$
$$B=1.00\ M-1.11\ I+1.70\ Q$$

Because of the manner in which the red video signal is modulated on the subcarrier at the transmitter, the I and Q signals appearing as the output of modulators 61 and 62 have magnitudes of 60% and 21% respectively of the maximum amplitude. Using these values in the matrix equations, it can be seen that the G and B signals are equal and that the R signal is larger than the G and B signals. Since the R, B and G signals individually control the intensities of the red, blue and green electron guns of kinescope 58, it can also be seen that if the signals are equal, the red, blue and green phosphor dots in an elemental area of the viewing screen of the kinescope would be equally excited resulting in the apparent emission of achromatic light from such area. Under this condition (associated with monochrome television transmission) a scan of the raster by the three electron beams would produce a black-and-white image. However, since the R signal is larger, the red beam will be more intense than both the green and the blue beams by an amount related to the red picture information, and the light emitted from an elemental area will be reddish. The effect is that the beams of the kinescope reproduce on the viewing screen thereof the green color-separation image in achromatic light superimposed upon the red color-separation image in red light. This is exactly what is necessary in order to produce color television displays in accordance with the "red-white" theory of color. An essential feature of the "red-white" theory of color television is that one of the dominant wave-lengths of the two color-separation images be in the relatively long wavelength region of the visible spectrum and that the other be in the relatively short wavelength region of the spectrum. Hence, the color of the red light in which the longer dominant wavelength color-separation image is reproduced need not match the color of the longer dominant wavelength color-separation image.

Figure 6:
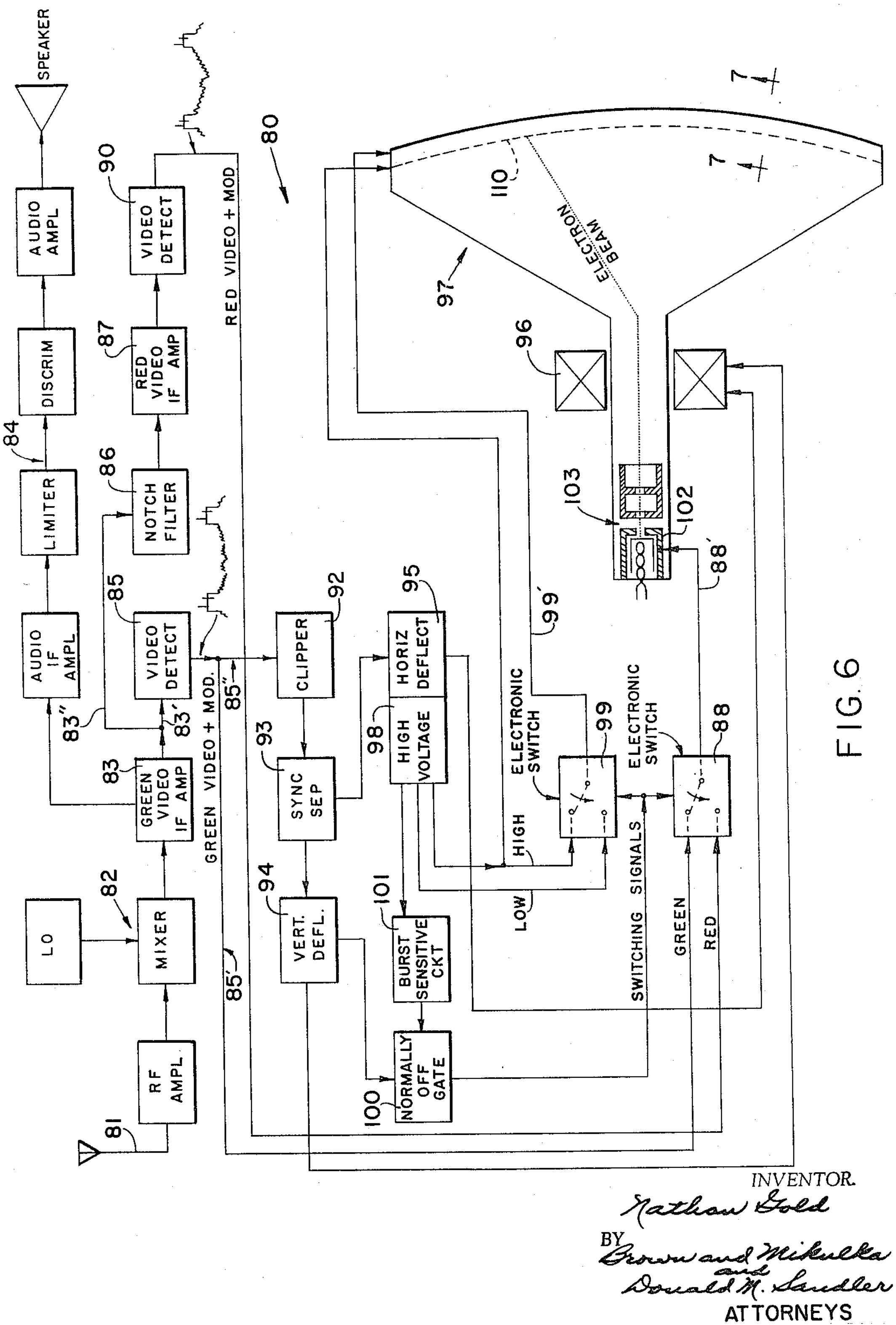
FIG. 6 is a block diagram of a "red-white" television receiver ideally suited to utilize the compatible color television signal produced by the apparatus shown in FIGURE 1.

From the above, it can now be appreciated that the novel compatible color television signal produced by the apparatus of FIGURE 1 causes the conventional three-color receiver to reproduce the *entire* green color-separation image in achromatic light and the *entire* red color-separation image in reddish light such that both reproductions are superimposed and in optical registration. Suitable color displays are achieved with a less complex receiver by interleaving, on a line-by-line basis, a reproduction of the green color-separation image in achromatic light with a reproduction of the red color-separation image in reddish light. In particular, one field scan can be in achromatic light and the next in red light to achieve the desired result. Reference to FIG. 6 which shows a novel "red-white" color receiver illustrates the latter approach. Receiver 80 includes antenna 81 for receiving the compatible color television signal radiated from the broadcasting plant. The RF signal is amplified and then mixed with the output of a local oscillator at 82 to convert the signal to an IF signal that comprises: the sound IF corresponding to the sound RF carrier; video IF corresponding to the main picture carrier RF; and video IF corresponding to the auxiliary carrier RF. The output of the mixer is passed through several stages of IF amplification at 83. The IF signal corresponding to the audio carrier is separated by conventional means and applied to sound channel 84, and the output of amplifier 83 is applied to two branches, 83′ and 83″. Branch 83′ is applied to video detector 85 and branch 83″ is applied to notch filter 86. Recalling that the amplitude of the RF auxiliary carrier signal is smaller than the amplitude of the RF main carrier signal due to the attenuation characteristic of the television transmitter, the IF signals corresponding to the auxiliary and main carriers will bear the same relationship. Thus video detector 85 detects the green video signal in the same manner as a monochrome receiver. This signal is utilized in two branches. Branch 85′ is applied to electronic switch 88 and branch 85″ is applied to the sinc separator circuit.

Notch filter 86 is tuned to the frequency of the IF picture carrier in order to reduce the amplitude of the latter relative to the amplitude of the IF color carrier. The output of filter 86 may be amplified at 87 and impressed on video detector 90. Because the amplitude of the IF picture carrier has been reduced by notch filter 86, video detector 90 detects the signal with respect to the IF color carrier. The output of detector 90 is the red video signal, and is applied to another input to switch 88. Branch 85″ at the output of detector 85 is provided to utilize the timing information in the signal. After clipping at 92, the signal is impressed on sync separator 93 which produces the timing pulses necessary to control the vertical deflection circuit 94 and the horizontal deflection generator 95 whose outputs are impressed upon deflection yoke 96 of kinescope 97. A sigh-voltage supply is obtained from a "fly-back" supply 98 associated with the horizontal deflection circuit, and provides at least two voltages, preferably at 9 kv. (low) and at 15 kv. (high), although the precise values are dependent on construction details of the kinescope viewing screen as will be explained later. The high and low voltages are applied to the two input terminals of electronic switch 99. The invention contemplates that switching between the two inputs of each of switches 88 and 99 will occur at the field frequency, and hence the vertical sync pulse is used for synchronization purposes. However, to provide for compatibility with monochrome transmission, vertical sync pulses derived from deflection circuit 94 are applied to each of switches 88 and 99 through normally-off gate 100. The latter is turned "on" by burst sensitive circuit 101 which is similar in operation to a conventional "color killer" circuit. That is to say, circuit 101 may be grid-controlled rectifier deriving power from a special winding on the horizontal output transformer. When color bursts are present on the receiver signal the rectifier is biased to cut-off and gate 100 effects transmission of the vertical sync pulses to switches 88 and 99. When bursts are absent, however, the rectifier conducts developing a signal that turns "off" gate 100 and prevents the passage of vertical sync pulses to the switches. Switches 88 and 99 are constructed and arranged so that the high voltage is connected to output lead 99' of switch 99 when the green video signal is connected to the output lead 88' of switch 88, when vertical sync pulses are absent (gate 100 turned off during monochrome transmission). During transmission by the apparatus of FIGURE 1 of the compatible color television signal already decribed, gate 100 is open and vertical sync pulses appear at the control inputs to switches 88 and 99 with the result that the voltage in lead 99' is high when the green video signal appears at lead 88', and the voltage in lead 99' is low when the red video signal appears at lead 88', switching occurring at the field frequency.

Figure 7:
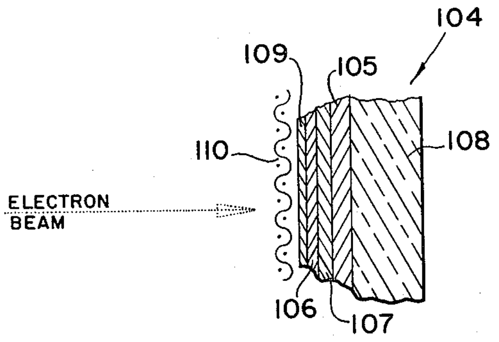
FIG. 7 is a section taken along the line 7—7 of FIG. 6 for the purpose of illustrating construction details of the "red-white" kinescope.

The signal at lead 88' is applied to the control grid 102 of the electron gun 103 associated with kinescope 97, and the voltage in lead 99' is applied to viewing screen structure 104 shown in detail in FIG. 7. Structure 104 comprises two superposed layers of luminescent material 105 and 106 separated by a barrier layer 107. Underlying layer 105 is preferably granular in nature and may be applied on glass endface 108 of kinescope 97 by settling the granules from a water suspension thereof that includes a small amount of potassium silicate which acts as a binder upon evaporation of the water. An example of a suitable material for layer 105 is TV phosphor type No. 137 available from Sylvania Electric Products, Inc. which emits blue-green light (cyan or minus-red light) upon electron excitation and has a grain size ranging from 3 to 10 microns. Preferably, about 1.8 milligrams of this phosphor per square centimeter of raster is used to produce a substantially uniform layer approximately 2 grains in thickness. Such layer will be optically translucent.

Layer 107 is a thin film of non-luminescent material vacuum deposited over layer 105. Preferably, layer 107 is zinc sulfide having a thickness of about 0.1 micron to provide a barrier against the transmission of low energy electrons while being optically translucent. Overlying layer 106 is composed of material which is uniformly distributed over the raster but covers less than 100%, and emits red light under electron excitation. Like the material of layer 105, the material of layer 106 is granular in nature and may be applied over the barrier layer by settling the granules from a water suspension. A suitable material is TV phosphor type No. 151 available from Sylvania Electric Products, Inc., having a grain size ranging from 3 to 6 microns. Preferably about 0.6 milligram of this phosphor per square centimeter of raster is used such that about 50% of the raster is covered. However, the coverage may vary from 50% to 70%, and adequate results are obtained when the coverage of layer 106 is such that about 30% to 50% of the electrons impinging upon the overlying layer penetrate the same without substantial energy loss. Aluminum coating 109 is evaporated over layer 106 such that there is about 10% transmission of light. Coating 109 is coupled to the output lead 99' and metal screen 110 covering the entire raster, parallel to the surface defined by glass face 108 and about a quarter of an inch from coating 109, is coupled to the high voltage output from supply 98.

Recalling that the red and green video signals are selectively applicable to the control grid of the electron gun in synchronism with the modulation of the voltage at coating 109 between the low and the high level at the field frequency, the electron beam excites the red light producing layer 106 during one field scan and then excites both layers 105 and 106 during the next field scan, etc. All electrons emitted from gun 103 are initially accelerated to the same degree by the constant voltage on screen 110 regardless of the voltage on coating 109, so that the ultimate deflection of the beam and hence the image size becomes substantially independent of the modulation voltage on coating 109. The image size thus remains substantially constant despite the fact that electrons impinging on the layers of luminescent material have two discrete energy levels as established by the modulating voltage. When the lower of the two voltages is applied to coating 109 (e.g., when the electron beam is modulated by the red video), electrons passing through screen 110 are decelerated to a velocity such that the grains of layer 106 are opaque to such electrons. Electrons intercepted by the grains excite the latter into emission of red light which an observer views through translucent layers 105 and 107. Interstitial electrons, namely those passing in the vacancies between the grains of layer 106 without substantial energy loss, penetrate beyond the layer into barrier layer 107 and make no contribution to the radiant output of layer 106. The relative amount of red light emitted from a unit area of the viewing screen is thus directly related to the coverage of the raster by the grains of layer 106.

Barrier layer 107 prevents excitation of layer 105 when the lower of the two voltages is applied to coating 109 because it is thick enough to decelerate interstitial electrons to a point where they have insufficient energy to excite layer 105 to emit visible light, even if the barrier is not thick enough to be opaque to the interstitial electrons. When the higher of the two voltages is applied to coating 109 (e.g., when the electron beam is modulated by the green video signal), the interstitial electrons have sufficient energy to penetrate the barrier layer and excite the grains of layer 105 such that they emit minus red light. The higher voltage is selected such that the amount of red light emitted by layer 106 over an elemental area defined by the beamwidth (picture element) is substantially equal to the amount of minus-red light emitted by layer 105 (including any dimunition of the red light by its passage through the barrier layer and the underlying luminescent layer) with the result that achromatic light is emitted from the elemental area. The term "achromatic" light as used herein is intended to mean light that lacks substantial hue commonly referred to as "white" light. It can now be seen that during one field scan of the electron beam, the lower of the two accelerating voltages is applied to layer 109, while the intensity of the beam (rate at which electrons impinge the screen) is controlled by the red video signal applied to the grid of the electron gun, causing the beam to reproduce on the raster in red light that part of the red color-separation image traversed by the scan thereof during said one field scan. During the next field scan of the beam, the higher of the two voltages is applied, while the intensity of the beam is controlled by the green video signal applied to the grid causing the beam to reproduce on the raster in achromatic light that part of the green color-separation image traversed by the scan thereof during said next field scan. The two fields, making up a single frame, are held in registration because of screen 110 as previously described. Since sequential scans in an odd-line interlace scanning type program are interleaved, half of the red color-separation image as seen by the red pick-up tube at the camera is reproduced on the viewing screen in red light and half of the green color-separation image as seen by the green pick-up tube is reproduced in achromatic light interleaved with the red picture. The result is that at distances from the viewing screen too remote to resolve the line structure of the reproduced picture, the scene being televised will appear in full color to an observer.

Those skilled in the art can now appreciate that the present invention, in its broadest aspect, contemplates the modulation of a first video signal on a frequency-interlaced subcarrier to produce a modulated subcarrier, and the modulation of a second wideband video signal, combined with the modulated subcarrier, on the main picture carrier assigned to a preselected television channel. The apparatus shown in FIGURE 1 by which this is accomplished permits the first signal (corresponding in the red video), when recovered at a receiver, to have a bandwidth that cannot exceed the frequency of the color subcarrier; while permitting the second signal (corresponding to the green video) to have the nominal 4 mc. bandwidth normally associated with monochrome transmission. In many of the older monochrome receivers, the bandwidth is severely limited by components of the receiver so that such sets, upon the application of the recovered red video, would produce substantially the same picture quality whether the bandwidth were of the same order of magnitude as the color subcarrier frequency or larger. In such case, the apparatus shown in FIGURE 1 is capable of transmitting two video signals which, when recovered at a receiver, are each of a bandwidth capable of producing a complete television picture. While the description above relates to video signals individually associated with red and green color-separation images, it is believed apparent that they could be derived from a single monochrome camera viewing a scene or two monochrome cameras viewing the same or different scenes. The latter situations can be used to provide stereoscopic television using a single television channel, or the simultaneous use by two separate television stations of the same channel.

Figure 8:
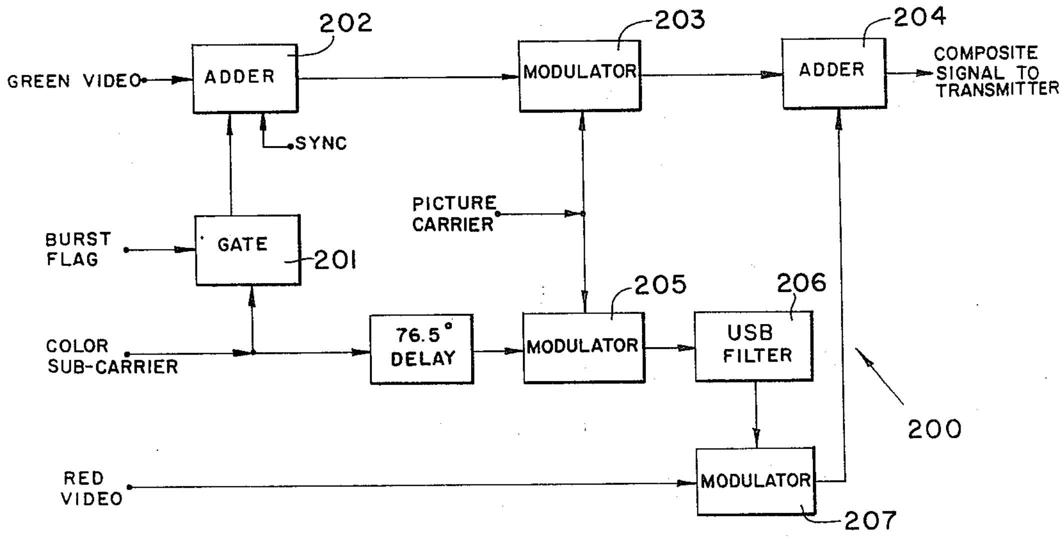
FIG. 8 is a block diagram of a portion of a television broadcasting plant by which each of two video signals can be transmitted using the entire permissible bandwidth of a single television channel.

To permit the recovered signals in each channel of the receiver to have comparable bandwidths, the apparatus of FIGURE 1 can be modified as shown in FIG. 8 which shows wideband modulation system 200. In such case, the subcarrier output obtained from the master crystal oscillator is gated at 201 by the burst flag into an input to adder 202 which adds the sync and the green video from the green channel of the signal processing equipment. The output of adder 202 contains the green picture information, together with synchronizing information and the color bursts. This output is then modulated at 203 onto the main picture carrier, and the modulated signal is then applied to one input to adder 204.

After delaying the phase of the subcarrier output by 76.5° it is also modulated on the picture carrier as at 205. The output of modulator 205 is passed through upper-sideband filter 206 which removes the lower sideband and the picture carrier leaving the auxiliary carrier (whose frequency is higher than the picture carrier by the subcarrier frequency). The red video is modulated on the output of filter 206 by modulator 207 whose output is also applied to an input to adder 204. The result is that the output of adder 204 is a composite color television signal which includes the green video modulated on the main picture carrier and the red video contained in the modulation on the auxiliary carrier. The conventional filtering at the transmitter output would restrict the composite signal to the bandwidth shown in FIG. 2. The significant difference between the output of adder 204 and of apparatus 200 shown in FIG. 8 and the output of adder 29 of apparatus 10 shown in FIGURE 1 is that both the red and the green video signals are of equal bandwidth. As a result, the two signals recovered at a receiver have the same bandwidth as a conventional monochrome signal. While each recovered picture signal has the other recovered signal superimposed thereon in the form of a 3.6 mc. modulated signal, the integrating effect achieved by the human eye permits each recovered signal to be used to furnish an independent picture substantially unaffected by the presence of the other recovered signal superimposed thereon.

Since certain changes may be made in the above apparatus without departing from the scope of the invention herein involved, it is intended that all matter contained in the above description or shown in the accompanying drawings shall be interpreted as illustrative and not in a limiting sense.

What is claimed

1. A compatible color television system comprising:

(*a*) means for producing two color-separation images representing relatively long and relatively short visible wavelengths of light from a scene being televised;

(*b*) means to cause said color-separation images to be individually scanned simultaneously and in synchronism according to a given periodic program to produce two video signals each representative, at any instant, of the amount of light of a different one of said relatively long and short wavelengths of light emanating from the elemental area of the scene being scanned at any instant; at least the video signal representing the shorter wavelengths of light containing frequency components extending to at least about a frequency range required for transmission and reproduction of a monochrome television image;

(*c*) means to produce a subcarrier whose frequency is an odd multiple of half the line frequency of the system;

(*d*) means to modulate the video signal representative of the longer wavelengths of light on said subcarrier;

(*e*) means to generate a carrier associated with a preselected television channel;

(*f*) means to produce synchronizing signals of said subcarrier frequency displaced in phase from said subcarrier by a predetermined amount which will cause a three-color television receiver matrix to produce color-related output signals in the color range of relatively long wavelengths of light; and (*g*) means to modulate on the carrier said synchronizing signals and, simultaneously, as the color-characterizing video signals thereon, signals representative of said shorter wavelengths of light and representative of the subcarrier modulated by signals representative of said longer wavelengths of light.

2. A compatible color television system as set forth in claim 1 wherein said means to modulate on the carrier as color-characterizing signals the signals representative of said shorter wavelengths includes means modulating on the carrier frequency components of said last-named signals extending to about four megacycles, and wherein said means to produce synchronizing signals of said subcarrier frequency displaced in phase from said subcarrier includes delay means developing a lag of substantially 76.5 degrees of said subcarrier in relation to said synchronizing signals.

3. A compatible color television transmitting system comprising:

(*a*) means for producing a red and a green color-separation image of the scene being televised;

(*b*) means to cause the red and green color-separation images to be individually scanned in synchronism according to a given periodic program to produce a pair of video signals, termed the red video signal and the green video signal, respectively, which, at every instant, are representative of the brightness of elemental areas of the images that correspond to the same area of the scene being televised;

(*c*) means for generating horizontal sync pulses;

(*d*) means for producing a CW signal at a chrominance subcarrier frequency that is nominally 3.6 mc.;

(*e*) gate means responsive to said horizontal sync pulses for producing bursts of said CW signals at a pre-established phase that occur in point of time during the back porch interval following each horizontal sync pulse;

(*f*) phase shifter means for shifting the phase of said CW signal by a preselected amount to define a phase-shifted CW signal;

(*g*) modulator means constructed and arranged to modulate said red video signal upon said phase-shifted CW signal to define a modulated subcarrier signal which includes the carrier and both sidebands;

(h) summing means for electrically adding said horizontal sync pulses, said green video signal, said modulated subcarrier signal and said bursts of CW signals to define a composite signal;

(i) means to generate a picture carrier in a preselected television channel; and (j) means to modulate said composite signal on said picture carrier.

4. A compatible color television transmitting system in accordance with claim 3 wherein said preselected amount of phase shift is −76.5°.

5. A compatible color television transmitting system in accordance with claim 4 wherein the modulated picture carrier is passed through a vestigial sideband filter for limiting the sidebands to said preselected television channels.

6. A compatible color television transmitting system comprising:

(a) means for producing a red and a green color-separation image of the scene being televised;

(b) means to cause the red and green color-separation images to be individually scanned in synchronism according to a given periodic program to produce a pair of video signals, termed the red video signal and the green video signal, respectively, which, at every instant, are representative of the brightness of elemental areas of the images that correspond to the same area of the scene being televised;

(c) means to generate a chrominance subcarrier having a frequency which is nominally 3.6 mc.;

(d) summing means having a plurality of inputs and one output, said summing means being constructed and arranged so that the output signal is the sum of the signals at said inputs;

(e) means for generating horizontal sync pulses;

(f) means to connect the horizontal sync pulses so generated into an input of said summing means;

(g) means for gating into an input to said summing means a burst of said subcarrier at a pre-established phase on the back porch interval following each horizontal sync pulse;

(h) means for shifting the phase relation between the phases of said subcarrier and the bursts of said subcarrier such that the phase of said subcarrier is delayed about 76.5 degrees in relation to the phase of said bursts;

(i) means to modulate said red video signal on said subcarrier which is delayed about 76.5 degrees in relation to said bursts;

(j) means to connect the modulated subcarrier and said green video signal to inputs to said summing means;

(k) means to generate a picture carrier associated with a preselected television channel; and (l) means to modulate the output signal of said summing means on said picture carirer.

7. In a color television system wherein reddish and greenish color-separation images of the scene being televised are individually scanned in synchronism according to a given periodic program to produce two video signals, one of which is associated with the scan of the reddish color-separation image and is termed the red video signal, and the other of which is associated with the scan of the greenish color-separation image and is termed the green video signal; the combination of:

(a) means to generate horizontal sync pulses;

(b) means for producing a CW signal, termed the chrominance subcarrier, at a nominal frequency of 3.6 mc.;

(c) gate means responsive to said horizontal sync pulses for producing pulses of said CW signal at a pre-established phase, said pulses occurring in point of time during the back porch interval following each horizontal sync pulse;

(d) phase shifter means for shifting the phase of said CW signal by about −76.5° to define a phase-shifted CW signal;

(e) modulator means for modulating said red video signal upon said phase-shifted CW signal to define a modulated subcarrier;

(f) means to generate an RF picture carrier in a preselected television channel;

(g) means to cause said horizontal sync pulses, said green video signal, and said pulses of CW signal to modulate said picture carrier and produce an RF picture signal that contains the RF picture carrier and another carrier at a frequency nominally 3.6 mc. above said picture carrier, the other carrier being termed the RF color carrier; and (h) compatible television receiving means for receiving and displaying the RF picture signal.

8. Apparatus in accordance with claim 7 wherein said television receiving means includes:

(a) frequency converter means responsive to said RF picture signal for converting the same to an IF picture signal;

(b) detector means responsive to said IF picture signal for demodulating the latter to produce a luminance signal; and (c) display means including a monochromatic kinescope whose electron beam is modulated by said luminance signal.

9. Apparatus in accordance with claim 7 wherein said television receiving means includes:

(a) frequency converter means responsive to said RF picture signal for converting the same to an IF picture signal;

(b) detector means responsive to said IF picture signal for demodulating the latter to produce a luminance signal;

(c) means responsive to said horizontal sync pulses and said pulses of CW signal to produce a receiver CW signal having the same frequency and phase as said chrominance subcarrier;

(d) synchronous demodulator means responsive to said receiver CW signal and said luminance signal for producing a pair of chrominance signals in phase quadrature and of magnitudes defining a substantially saturated red;

(e) matrixing means for cross-mixing said luminance signal with said pair of chrominance signals for producing three primary signals; and (f) display means including a three gun tri-color kinescope each of whose individual electron beams is controlled by a different one of said three primary signals.

10. Apparatus in accordance with claim 7 wherein said television receiving means includes:

(a) frequency converter means responsive to said RF picture signal for converting the latter to an IF picture signal containing the IF picture carrier and the IF color carrier separated in frequency by nominally 3.6 mc.;

(b) video detector means responsive to the output of said frequency converter means for demodulating said IF picture carrier and producing a first demodulated signal;

(c) attenuator means to attenuate the amplitude of said IF picture carrier relative to the amplitude of said IF color carrier;

(d) second detector means responsive to the output of said attenuator means for demodulating said IF color carrier and producing a second demodulated signal; and (e) means for applying said first and second demodulated signals to said kinescope in a preselected manner.

11. Apparatus in accordance with claim 10 wherein said attenuator means is a notch filter tuned to the frequency of said IF picture carrier.

12. A television receiver for use in connection with a preselected television channel broadcasting a main picture carrier and standard sync information, said receiver comprising:

(a) means to convert the broadcast television signal to an IF signal that includes the IF picture carrier;
(b) first video detector means to demodulate said IF picture carrier;
(c) attenuator means for selectively attenuating the amplitude of said IF picture carrier;
(d) second video detector means to demodulate the output of said attenuator means;
(e) a kinescope selectively connectable to the outputs of said first and second video detectors; and
(f) means responsive to the absence of a color burst on the back porch interval following the horizontal sync pulse which may be a part of said standard sync information for causing only the output of said first video detector to be connected to said kinescope, and to the presence of a color burst for causing the outputs of said first and second video detectors to be alternately connected to said kinescope at the field frequency of the system.

13. A color television receiving system for receiving an RF television signal that includes a picture carrier and a subcarrier modulated to characterize different color-separation images of a televised scene, the subcarrier being of lesser amplitude than that of the picture carrier and of frequency higher than that of the picture carrier by an amount which is an odd multiple of half the line frequency of said system, comprising:

(a) means to receive the RF television signal;
(b) means converting the received television signal to an IF signal that includes an IF picture carrier and an IF auxiliary carrier of lesser amplitude than the IF picture carrier;
(c) first video detector means responsive to said converting means for demodulating said IF picture carrier to produce a first video signal characterizing one of the color-separation images with a superimposed signal at the subcarrier frequency characterizing the other of the color-separation images;
(d) attenuator means to attenuate the amplitude of the IF picture carrier relative to the IF auxiliary carrier;
(e) second video detector means responsive to the output of said attenuator means for demodulating said output to produce a second video signal characterizing the said other of the color-separation images with a superimposed signal at the subcarrier frequency characterizing the said one of the color-separation images;
(f) a kinescope including phosphor means for producing displays in substantially achromatic light and in light of relatively long visible wavelength; and
(g) means responsive to said first and second video signals for causing said color-separation images to be reproduced substantially in registration by said kinescope and respectively in achromatic light and in light of relatively long visible wavelength.

References Cited by the Examiner

UNITED STATES PATENTS

| | | | |
|---|---|---|---|
| 2,333,969 | 11/1943 | Alexanderson | 178—5.2 |
| 2,389,039 | 11/1945 | Goldsmith | 178—5.4 |
| 2,635,140 | 4/1953 | Dome | 178—5.2 |
| 2,993,086 | 7/1961 | De France | 178—5.2 |
| 3,003,391 | 10/1961 | Land. | |
| 3,146,302 | 8/1964 | Moore | 178—5.4 |

DAVID G. REDINBAUGH, *Primary Examiner.*

J. A. O'BRIEN, *Assistant Examiner.*